United States Patent
Sincaglia et al.

(10) Patent No.: US 7,721,314 B2
(45) Date of Patent: May 18, 2010

(54) SCHEDULED RETRIEVAL, STORAGE AND ACCESS OF MEDIA DATA

(75) Inventors: Nicolas W. Sincaglia, Sunnyvale, CA (US); James P. Lester, San Francisco, CA (US); Sylvain P. Rebaud, San Francisco, CA (US)

(73) Assignee: Listen.com Inc., San Francisco, CA (US)

( * ) Notice: Subject to any disclaimer, the term of this patent is extended or adjusted under 35 U.S.C. 154(b) by 0 days.

(21) Appl. No.: 12/414,544

(22) Filed: Mar. 30, 2009

(65) Prior Publication Data
US 2009/0183212 A1 Jul. 16, 2009

Related U.S. Application Data

(63) Continuation of application No. 09/733,698, filed on Dec. 8, 2000, now Pat. No. 7,565,675.

(60) Provisional application No. 60/169,587, filed on Dec. 8, 1999.

(51) Int. Cl.
*H04N 7/173* (2006.01)

(52) U.S. Cl. .............................. 725/96; 725/93; 725/94; 725/95

(58) Field of Classification Search ............. 725/93–96
See application file for complete search history.

(56) References Cited

U.S. PATENT DOCUMENTS

| | | | | |
|---|---|---|---|---|
| 5,761,607 | A * | 6/1998 | Gudesen | 725/89 |
| 6,536,043 | B1 * | 3/2003 | Guedalia | 725/90 |
| 6,625,655 | B2 * | 9/2003 | Goldhor et al. | 709/231 |

* cited by examiner

*Primary Examiner*—Hunter B. Lonsberry
(74) *Attorney, Agent, or Firm*—AXIOS Law; Adam L. K. Philipp

(57) ABSTRACT

A system and method automates a scheduled retrieval, storage, and access of media data. Media data is retrieved from an external source and downloaded to an end user media device storage for subsequent playback at the end user media device. Media data is accessible from the end user media device storage based upon criteria including a selection of the end user, rules regulating the media data, and whether a playback time of the media data is sufficient to retrieve additional media data. The system performs regularly scheduled dynamic controls to determine whether additional media data is required for continuous and uninterrupted access of the media data.

16 Claims, 6 Drawing Sheets

SCHEDULED RETRIEVAL, STORAGE AND ACCESS OF MEDIA DATA

CROSS-REFERENCES TO RELATED APPLICATIONS

This application is a continuation of U.S. patent application Ser. No. 09/733,698, filed on Dec. 8, 2000, which claims priority under 35 U.S.C. 119(e) to provisional U.S. patent application Ser. No. 60/169,587, filed Dec. 8, 1999. This application also is related to U.S. patent application Ser. No. 09/488,487, filed Jan. 20, 2000. The above-cited applications are incorporated herein by reference in their entirety, for all purposes.

BACKGROUND

This invention relates to media devices, specifically to devices for connecting to a network to efficiently manage the retrieval, storage and access of media data.

Prior art devices used to receive media data over a network have been designed for the end user to select stored media data, and either receive the media data streamed individually over a network (unicast), or receive the data already being broadcast to large numbers of users (multicast). Both of the delivery methods of the prior art employs one or more network servers responsible for the scheduling, retrieval and transmission of the media data to the end user. The end user media device generally performs the access and processing of the media data. In this scenario, each media data program must be re-transmitted by a media data provider each time it is scheduled for broadcast, or each time the end user decides to access the data. As a result, these methods of media data delivery are inefficient with respect to network bandwidth utilization, and therefore impart high network costs to the media data provider.

Methods have been developed to alleviate some of the negative effects associated with these inefficient transmission methods. One such development stores the media data at data hubs that are closer in proximity to the end user, thereby reducing network congestion, associated cost, and increasing efficiency by eliminating the need to re-transmit media data over long distances. However, this methodology does not reduce the need for individualized re-transmission of media data each time an end user makes a selection. U.S. Pat. No. 5,828,904 of Batson et al. describes the scheduled retrieval of data, however this system does not take advantage of storing media data locally for efficient re-accessing. Further, this system does not provide for copyright owners restrictions and other conditions placed on the media data. U.S. Pat. No. 5,826,080 of Dworzecki describes the scheduling of tasks subject to timing and succession constraints. However, this patent does not provide for additional restraints required by media data or copyright owners. In addition, the patent explicitly states that no task is performed at the same time as another task, thus limiting the access rate of the overall system.

U.S. Pat. No. 4,949,187 of Cohen describes a video communication system which stores programs locally on a viewing device. This device also limits the access to particular movies and keeps track of royalty payments to movie providers. However, the device of this patent has no means for scheduling the retrieval, storage and access of movie or media data. Further, there is no disclosure of access restrictions placed on individual media data which dictate the scheduled retrieval, storage and access of media data. U.S. Pat. No. 5,898,892 to Gulick et al. describes a computer system with a data cache for providing real-time multimedia data to a multimedia engine. However, this system does not consider the efficiencies of media data reuse and access restrictions to media data based on media data and copyright owners restrictions. Therefore, a need remains for an method and system for managing retrieval, storage and access of media data to provide a continuous play list of media data downloaded from an external source, while considering any restrictions placed upon that media data.

SUMMARY OF THE INVENTION

In accordance with an exemplary embodiment of the present invention, a method and system is provided for an end user media device to manage the scheduling of retrieval, storage, and access of media data over a network while maximizing delivery efficiencies and thereby reducing transmission costs.

It is an advantage of the present invention to provide for the efficient delivery of media data to the end user media device utilizing a methodology by which the scheduling of the data retrieval is automated.

It is another advantage to provide media data that is stored locally within the user media device. Thus, if media data is scheduled for multiple sessions, the media data remains resident on the user's media device such that there is no need for network retransmission, thereby maximizing efficiency. As an added benefit, resident data does not exhibit corruption, lost data, dropouts, signal strength fading, interference or multi-path distortions associated with data transmitted via traditional methods.

It is still another advantage of the present invention to provide the simultaneous scheduling of retrieval, storage and access for faster and more efficient utilization of the user media device.

A further advantage of the present invention is to provide a system for scheduling access of media data by complying with laws or requirements associated with the media data as determined by the media content owners or copyright holders. Additionally, access scheduling also may be determined by end user interaction with the system. Finally, access scheduling may be developed to provide the end user with a variety of new data while, at the same time, minimizing the overall turnover rate of the resident media data, thereby reducing network traffic due to repeated transmission. Using this methodology, data is sent over the network only when the media device determines a need for new data.

In an exemplary embodiment of the present invention, an end user media device includes a system scheduler for managing scheduled retrieval, storage and access of media data. The system scheduler sends control signals to a data transfer controller for downloading data media from a data network into media storage locations for eventual output to a user on a sound and/or display controller by means of a media processing engine. The system scheduler of the end user media device contains methods for determination of data format and associated bit rate of the media data to be retrieved in order to maintain scheduled retrieval and access of media data without interruption. This determination is based upon media data already resident in the media storage locations and on aggregate data transfer rate over the data network. Once retrieved from the network, the associated quality of a particular instance of media data, e.g. a media file, is fixed for the period that the media data exists in the media storage. Storage processes of retrieved media data and access to the media data is further regulated based upon requirements associated with the media data and inputs from a user input control.

In an exemplary method of the present invention, the system scheduler processes control signals to a data transfer controller, media storage locations, and a media processing engine in response to a user input control. Stored media data in the media storage locations is verified for playback accessibility based upon the rules associated for each stored media data. The system scheduler further determines a total playback time of the accessible media data contained in each of the media storage locations including a user selected media storage location. The end user media device commences processing of the user selected media storage location if sufficient media data is available for uninterrupted processing. The system scheduler signals the data transfer controller to download additional media data into any media storage locations that do not contain sufficient media data for uninterrupted processing, with the selected media storage location having priority for receiving the downloaded media data. If a media storage location is full but does not contain sufficient accessible media data for processing, the inaccessible data is purged from the media storage location, and additional media data is downloaded.

BRIEF DESCRIPTION OF THE DRAWINGS

The present invention will be better understood from the following detailed description of an exemplary embodiment of the invention, taken in conjunction with the accompanying drawings in which like reference numerals refer to like parts and in which.

The following variables are referenced in the equations and/or figures:

NbPresets: Total number of presets.

Storage[ ]: Preset Media Storages (36a-36d)

ReadPreset: The preset currently processing media data or media data scheduled for processing.

WritePreset: A preset scheduled to receive media data from the network.

MediaBitrate: Enumeration of media bit rates supported by the system.

Tplaylist[ ]: Total playback time in each preset media storage.

StorageRatio[ ]: Cache Ratios for each Media data bit rate available.

Ttrigger[ ]: Triggers for playback and transfer media bit rate decisions.

OptimalMediaBitRate: Optimal Media Bit Rate for next media data transfer.

NbMediaBitRate: Maximum number of bit rate trigger calculations supported.

Tmin rotation: Minimum time associated with program rotation restrictions.

DESCRIPTION

Figure 1:
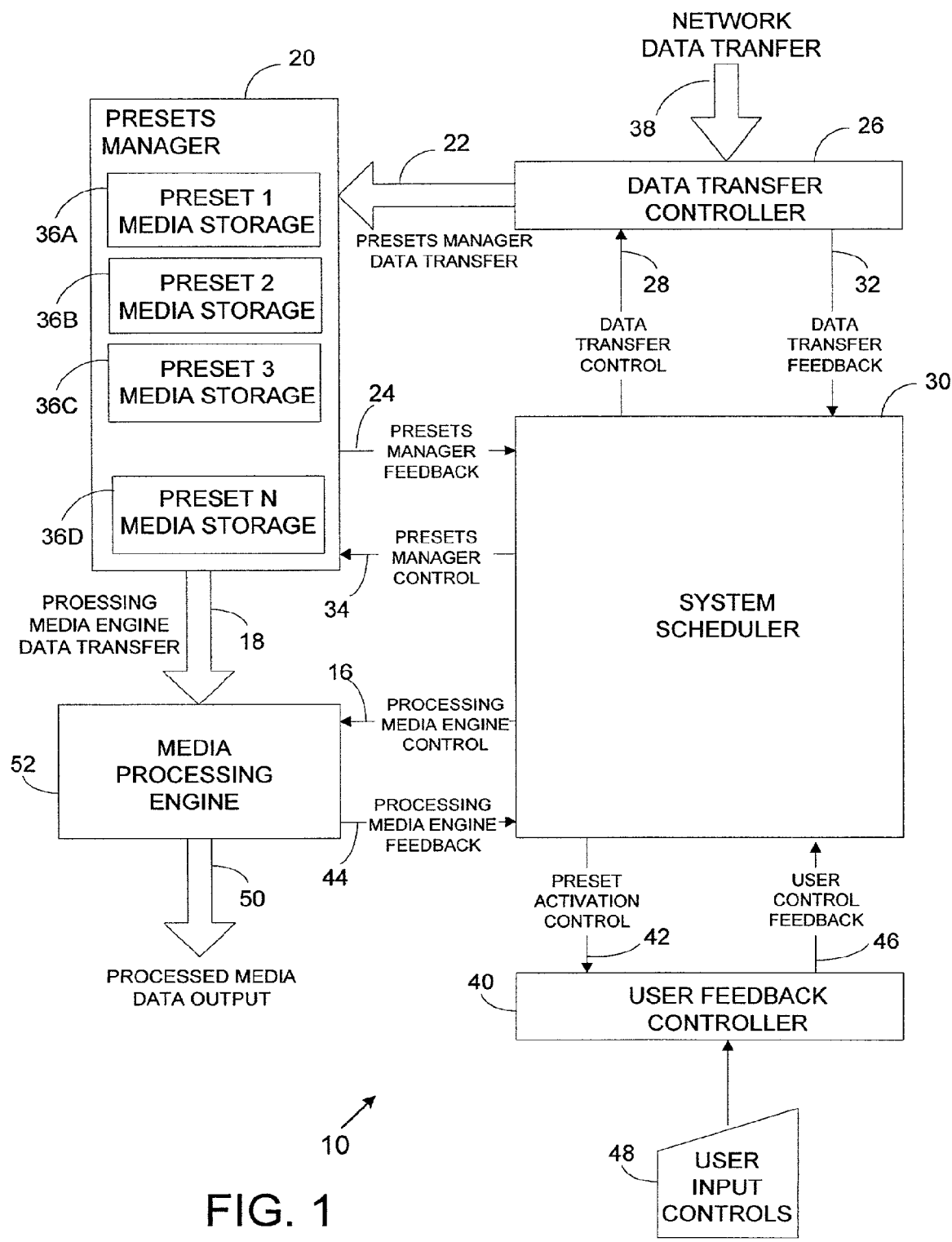
FIG. 1 illustrates a system for scheduled retrieval, storage and access of media data of a preferred embodiment.

FIG. 1 illustrates a system 10 of the preferred embodiment for scheduled retrieval, storage and access of media data. A data transfer controller 26 monitors the data transfer rate of the media data entering into the system 10 via a network data transfer 38. A data transfer rate is continually calculated by the data transfer controller 26, and is sent to a system scheduler 30 over a data transfer feedback 32 control line. The data transfer controller 26 is controlled by the system scheduler 30 via a data transfer control 28 line.

The system scheduler 30 sends control messages to a presets manager 20 via a presets manager control 34. Presets manager 20 includes any number of preset media storage locations 36a-36d in which the input media data is to be stored. The data transfer controller 26 routes the input media data to the presets manager 20 utilizing a presets manager data transfer 22 bus. The presets manager 20 notifies the system scheduler 30, via a presets manager feedback 24, of the current status of each preset media storage 36a-36d.

The system scheduler 30 sends a control message to a user feedback controller 40 via a preset activation control 42 when particular conditions are satisfied or unsatisfied. The user feedback controller 40 allows user selectable controls 48 to become activated or inactivated. The user feedback controller 40 accepts input controls from the end user utilizing user input controls 48. The end user may select the preset media storage 36a-36d which is intended for access. Each preset media storage 36a-36d may comprise media data having related criteria. Typical related criteria includes media data related in theme, style, or time period of public release. In one embodiment of the present invention, each preset media storage 36a-36d contains media data that is related according to criteria of style such as classical or popular music. The User feedback controller 40 sends feedback to the system scheduler via a user control feedback 46.

The system scheduler 30 sends control messages to a media processing engine 52 to initiate processing of media data from the user selected media storage. Control messages sent to the media processing engine 52 are sent via media processing engine control 16 lines. The presets manager 20 sends media data to the media processing engine 52 via a media processing engine data transfer 18 when the system scheduler 30 has enabled the user selected user preset media storage. Information about the media data in the process of being rendered is sent back to the system scheduler 30 via a media processing engine feedback 44. The processing media engine 52 processes the media data and outputs the data through a processed media data output 50.

Figure 6:
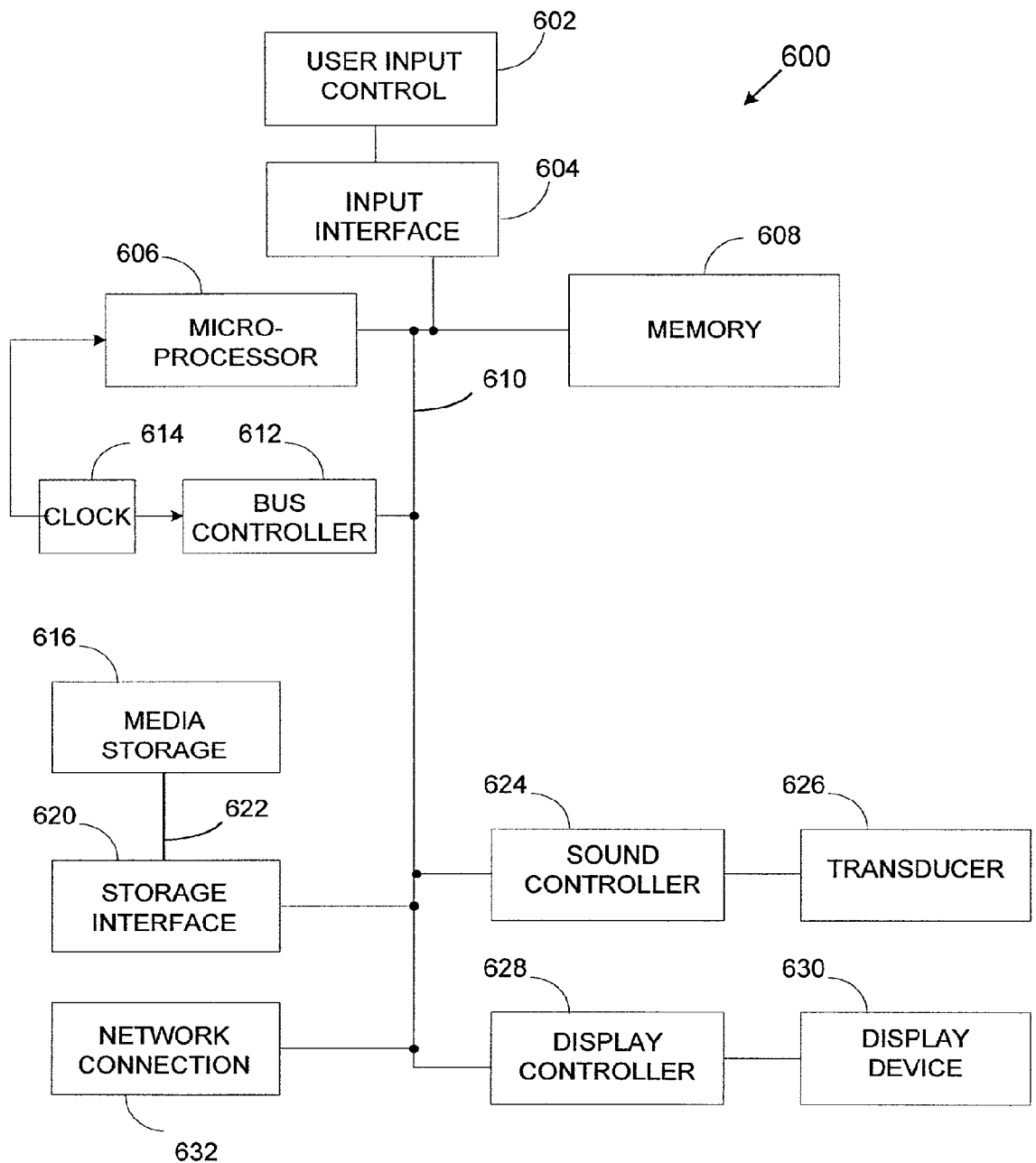
FIG. 6 illustrates a block diagram of a computer system for implementing the system for scheduled retrieval, storage and access of media data of the preferred embodiment.

FIG. 6 illustrates a block diagram of a computer system 600 for enabling an embodiment of the invention. The computer system 600 comprises microprocessor 606, memory 608, clock 614, bus controller 612, sound controller 624, sound transducer 626, display controller 628, display device 630, user input control 602, input interface 604, media storage 616, storage interface 620 and network connection 632. The clock generator 614 is utilized by the microprocessor 606 for determining timing for realtime playback of media data stored in the media storage 616. Microprocessor 606 is also coupled to memory 608, the input interface 604 and bus controller 612 by a first bus 610. Memory 608 is utilized to store an application of the present invention that implements the scheduled retrieval, storage and access of the media data. The input interface 604 is coupled to user input control 602. The user input control 602 accepts the user selections for preset media storage 36a-36d. The bus controller 612 is coupled to the clock generator 614, the sound controller 624, display controller 628 and storage interface 620 by a second bus 618. The sound controller 624 is coupled to sound transducer 626 which may, for example, be a conventional speaker for playing sound media data. Display controller 628 is coupled to display device 630 for playing graphical media data. Media storage 616 is utilized for storing media data, and is coupled to storage interface 620.

Microprocessor 606 may be a complex instruction set computing (CISC) microprocessor, reduced instruction set computing (RISC) microprocessor, very long instruction word (VLIW), application specific integrated circuit (ASIC) component, logic circuitry or other processor device. Microprocessor 606 executes instructions or code stored in memory 608, processes input data from User Input Control 602, and performs operations on audio data, video data or other data stored in media storage 616. Memory 608 may be a dynamic random access memory (DRAM), static random access memory (SRAM), cache memory, magnetic hard disk, optical CD-ROM, DVD-ROM or other optical disk or other memory device. Memory 608 may store instructions or code that are part of application programs, operating system programs or other computer programs to execution by microprocessor 606.

A storage interface 620 is coupled to a media storage 616 that may be a magnetic hard disk, non volatile read/write memory storage or other read/write optical disks. Media storage 616 is accessed through a computer network 632 or other suitable connection. Computer network 632 connectivity includes but is not limited to landline, wireless or satellite transmissions or any suitable connection to a network which will enable transfer of data from a network.

Referring to FIG. 1, at initialization of the system 10, the presets manager 20 sends messages to a system scheduler 30 that include the current status of each preset media storage 36a-36d. The status of each preset media storage 36a-36d includes the allocated cache storage size, a most recent time stamp access information for all media data stored in the media storage, the number of times the media data has been accessed in the past, and the end user's last access of a preset media storage 36a-36d. Based upon the status of the preset media storage, the system scheduler 30 selects the preset media storage 36a-36d for receiving media data retrieved from the network data transfer 38. The system scheduler 30 sends a control message 28 to the data transfer controller 26 to begin retrieving media data from the network 38. The control message 28 also indicates which preset media storage 36a-36d is selected to receive the media data. The data transfer controller 26 begins retrieving data from the network 38 and calculates the average data transfer rate of the data. The average data transfer rate is calculated using a moving average over a specified period of time. The average data transfer rate is given by:

$$\text{average\_data\_transfer\_rate} = (\text{bytes\_downloaded})/\Delta t \quad \text{Equation 1}$$

$$\text{where } \Delta t = t_{current\_time} - t_{start\_time\_of\_interval} \quad \text{Equation 2}$$

The data transfer controller 26 sends the calculated average data transfer rate from the network back to the system scheduler 30 utilizing the data transfer feedback line 32. The system scheduler 30 signals the presets manager 20, utilizing the presets manager control line 34, that media data is being transferred from the data transfer controller 26. The presets manager 20 accepts the media data transfer from the data transfer controller 26, and enables write access to one of the preset media storage devices 36a-36d.

The presets manager 20 continually updates the status of the preset media storage 36a-36d and messages the status information to the system scheduler 30. The system scheduler 30 saves the preset media storage status information, the calculation of the data transfer rate, and scheduling criteria for further processing. Scheduling criteria is often dictated by laws or requirements placed on the individual media data by the media content owners or copyright holders. Some of the possible restrictions placed upon the media data may include when or how often the data can be accessed, limits set on the number of times the data is allowed to be accessed or a combination of both. A storage ratio value, StorageRatio[i], is calculated based on the average data transfer rate and a media data bit rate as shown in equation 3.

$$\text{StorageRatio}[i] = (\text{average\_data\_transfer\_rate})/(\text{MediaBitrate}[i]) \quad \text{Equation 3}$$

where the MediaBitrate[i] is a bit rate supported by the system. The system scheduler 30 calculates a different cache ratio for each supported media data bit rate.

The system scheduler 30 categorizes the stored media files into three categories including "Access to Media Data Granted", "Access to Media Data Denied" and "Discarded Media Data" based upon the status of each media data instance contained within each preset media storage 36a-36d. Media data that has never been accessed will be placed in the "Access to Media Data Granted" category. Media Data that has recently been accessed and does not comply with the scheduling restrictions placed on the media data by the media content owners or copyright holders, will be categorized in the "Access to Media Data Denied". Media Data placed in the "Access to Media Data Denied" category will be placed in the "Access to Media Data Granted" category only when the scheduling restrictions allow. Media data is categorized in the "Discarded Media Data" category as a result of User Input Controls 48, or as dictated by scheduling restrictions. Media data categorized in the "Access to Media Data Denied" category may also be moved to the "Discarded Media Data" category by the System Scheduler 30 if data storage space is required to store new media data in one of the Preset Media Storages 36a-36d.

The System Scheduler 30 selects the optimal data in the "Access to Media Data Denied" category to be moved to the "Discarded Media Data" category based upon the scheduling restrictions and maximum media data reuse. The media data in the "Discarded Media Data" category are eventually deleted from the system 10. The total playback duration of media data in a Preset Media storage 36a-36d is calculated by the System Scheduler 30 and is represented by "Tplaylist" for each Preset Media Storage 36a-36d. Only media data in the "Access to Media Data Granted" category contributes to this calculation.

Based on the data transfer rate calculated by the Data Transfer Controller 26, the System Scheduler 30 continually updates a trigger "Ttrigger[i]" for each media data bitrate "MediaBitrate[i]" received from the data transfer controller 26 over the data transfer feedback line 32 utilizing the StorageRatio[i] of equation 3 and equation 4 as follows:

$$\text{Ttrigger}[i] = T\text{min\_rotation}(1 - \text{StorageRatio}[i]) \quad \text{Equation 4}$$

where Ttrigger[i] is the total playback time needed to be able to download a new media at the Media_Bitate[i] without interrupting the current processing. The System Scheduler 30 determines the total playback time "Tplaylist" available for each preset media storage, and may schedule retrieval of new media data from the network if $$\text{Tplaylist} > \text{Ttrigger}[i] \quad \text{Equation 5}$$

The optimal media data bit rate "OptimalMediaBitRate" for the current download is equal to the MediaBitrate[i]. FIG.

5 illustrates a flowchart for an embodiment of the present invention for setting the optimal media data bit rate. The system scheduler 30 initializes a variable "i" based upon the number of MediaBitrates supported by the system, arranged from lowest to highest 502. If the total playback time in a particular preset media storage Tplaylist is less than Ttrigger[i] 504, then the variable "i" is decremented 506 and the comparison is performed again until either "i" is 0, block 508, or Tplaylist is greater than Ttrigger[i] 504. If Tplaylist is greater than Ttrigger, then the optimal media data bit rate for this preset is set to the media bitrate of "i", block 510, as calculated by the system scheduler 30. The system scheduler 30 may schedule a retrieval of new media data from the network 38 of optimal media bitrate. If i=0, then optimal media bitrate is equal to MediaBitrate[0] 512 even if Tplaylist is less than Ttrigger [0]. Furthermore, the System Scheduler 30 determines when access and rendering of media data should start to insure an uninterrupted playback of a user selected preset media storage 36a-36d, or if processing is predicted to be interrupted utilizing the equation:

$$Tplaylist > Ttrigger[0] \quad \text{Equation 6}$$

The System Scheduler 30 sends a message to the User Feedback Controller 40 at initialization time for each Preset Media Storage 36a-36d that is activated. The User Feedback Controller 40 sends a feedback message to the System Scheduler 30 when an end user wants to access data from a Preset Media Storage 36a-36d. The System Scheduler 30 sends a message to the Media Processing Engine 52 to begin accessing the stored data if an uninterrupted playback requirement, as described in equation 5, is met for the user selected Preset Media Storage 36a-36d. The System Scheduler 30 sends a message to the Presets Manager 20 to enable access and playback of the user specified Preset Media Storage 36a-36d. The Presets Manager 20 enables read access of the media data and the media data is sent to the Media Processing Engine 52 for processing. The System Scheduler 30 continually updates its calculations based on the status information from the Presets Manager 20, the Media Processing Engine 52, the Data Transfer Controller 26 and the User Feedback Controller 40.

Figure 2:
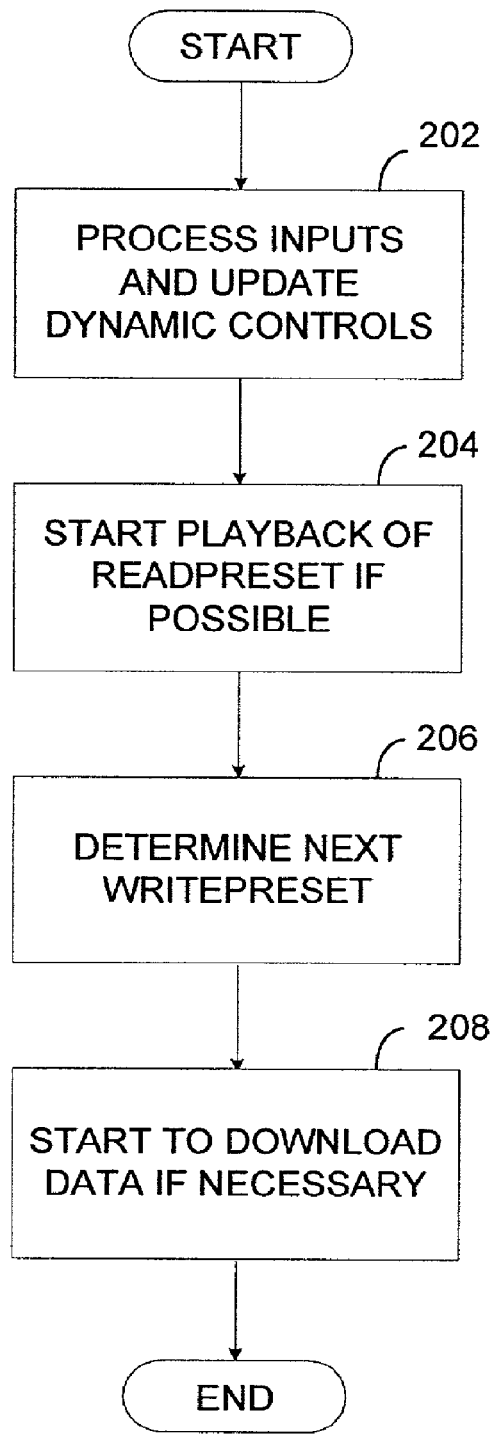
FIG. 2 illustrates a high level flow diagram for a method for scheduled retrieval, storage and access of media data of a preferred embodiment.

FIG. 2 is a flow chart of the system logic of an embodiment of the present invention as shown in FIG. 1 to determine the scheduling of the retrieval, storage and the access of media data by the system scheduler 30. In a first step 202, the system scheduler 30 processes inputs including the data transfer feedback 32, the presets manager feedback 24, the processing media engine feedback 44, and the user control feedback 46. Based upon the inputs, the system scheduler 30 updates the dynamic controls of the system 10 including updating of the average data transfer rate of Equations 1 and 2, the CacheRatio of Equation 3, and the Trigger of Equation 4. In step 204, the system scheduler 30 sends control signals to the presets manager 20 and media processing engine 52 to start playback of the user selected preset media storage 36a-36d if the media data is accessible based upon the accessibility requirements described above.

Figure 3:
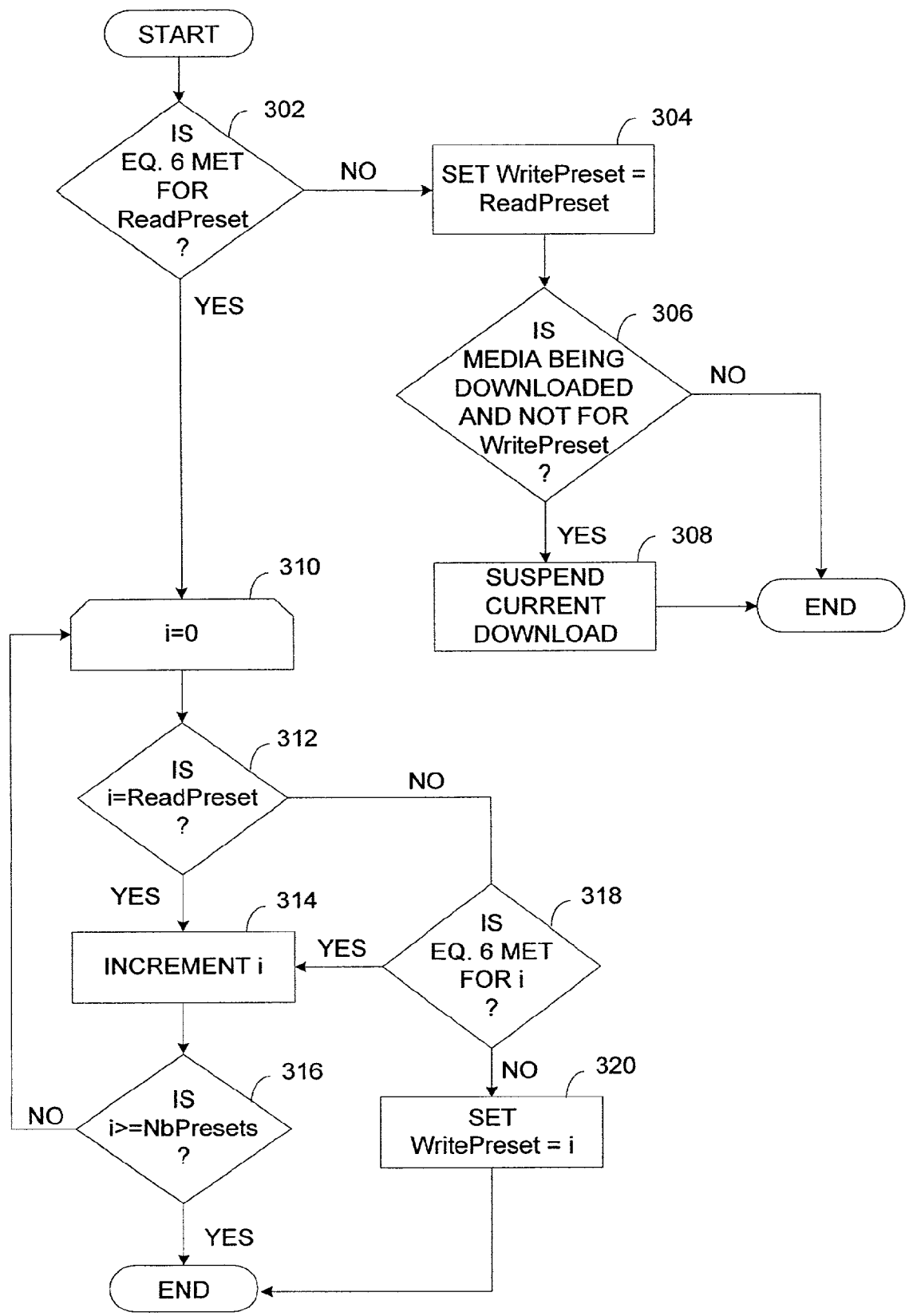
FIG. 3 is a detailed flow diagram of the determination of a next WritePreset of an embodiment of FIG. 2.

Continuing with FIG. 2, in step 206 the system scheduler 30 determines which, if any, preset media storage 36a-36d requires retrieval of additional data from the network 38. FIG. 3 illustrates a flowchart of an embodiment of block 206 of FIG. 2. In step 302, the system scheduler determines whether Tplaylist is greater than Ttrigger[0], as defined by Equation 6, for the "ReadPreset" which is a selected preset media storage 36a-36d. If the condition of Equation 6 is not met, then the ReadPreset requires data, and the preset media storage 36a-36d scheduled for receipt of data, i.e., WritePreset is set to ReadPreset in step 304. The system scheduler 30 determines whether the system 10 is currently downloading data 306. If data is being downloaded to ReadPreset, then the download continues. If data is being downloaded to another preset media storages 36a-36d, then the current download is suspended 308 due to the higher priority of filling ReadPreset, the selected preset media storage 36a-36d. If ReadPreset has sufficient media data for uninterrupted playback as determined in step 302, then the system scheduler 30 determines whether any of the remaining preset media storages 36a-36d require additional data by incrementing a variable 310 to step through each of the preset media storages 36a-36d other than the selected ReadPreset preset media storage 36a-36d as shown in the loop including steps 312, 314 and 316. If a preset media storage 36a-36d requires more media data 318, then WritePreset is set to that preset media storage 320.

Referring again to FIG. 2, once WritePreset is determined 206, the system scheduler 30 initiates downloading data, if necessary 208. If all preset media storage 36a-36d have sufficient data, then no downloading of data is required, and the system scheduler 30 repeats the process of scheduling of the retrieval, storage and the access of media data as shown in FIG. 2. If a preset media storage 36a-36d location requires data, the system scheduler 30 initiates the transfer of media data utilizing the data transfer controller 26.

Figure 4:
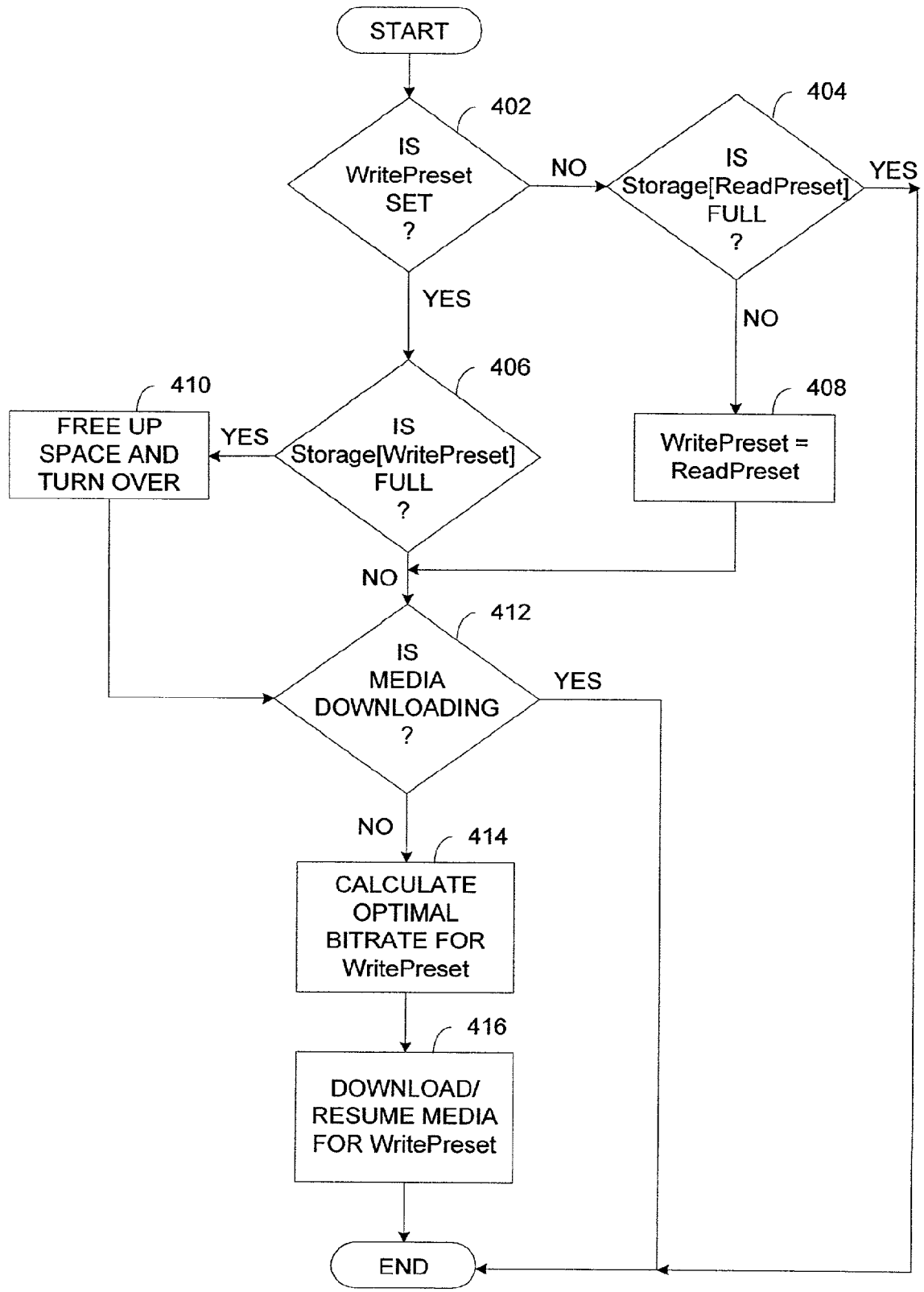
FIG. 4 is a detailed flow diagram for downloading data of an embodiment of FIG. 2.
Figure 5:
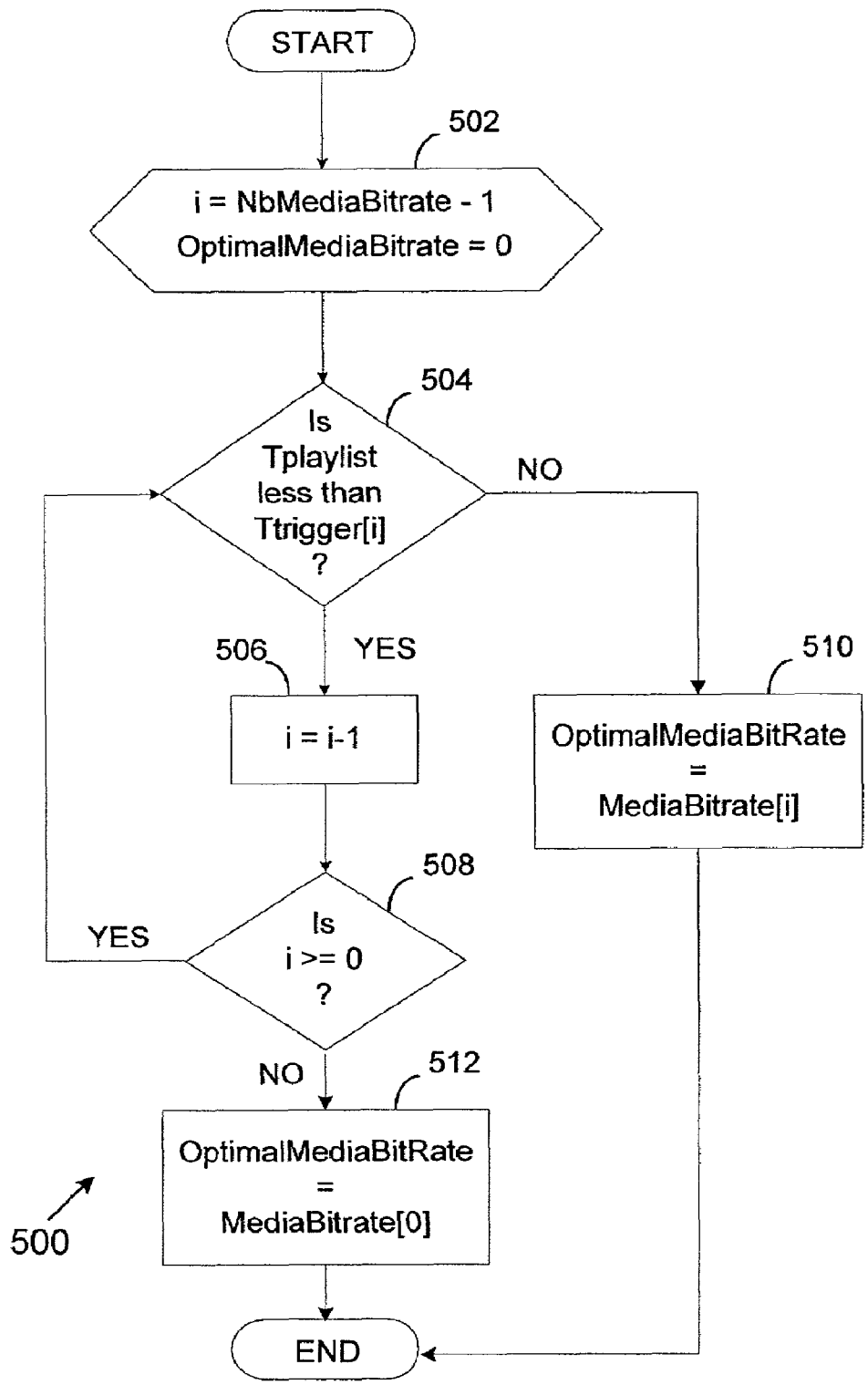
FIG. 5 illustrates an embodiment for determining an optimal media bit rate.

FIG. 4 illustrates a detailed flow diagram for an embodiment of the step of downloading data as shown in block 208 of FIG. 2. Referring to FIG. 4, the system scheduler 30 determines whether WritePreset is set 402 such that one of the preset media storage 36a-36d locations requires the retrieval of data. If retrieval is not required, the status of the current selected preset media storage 36a-36d, ReadPreset, is determined. If ReadPreset is full 404, the downloading is not necessary. If ReadPreset is not full 404, the WritePreset is set to ReadPreset 408 so that media data will be downloaded into ReadPreset. If WritePreset is set 402, then the system scheduler 30 determines whether the preset media storage 36a-36d corresponding to WritePreset is full 406. If the WritePreset memory is full, but data is categorized as inaccessible, then the inaccessible media data is removed from the WritePreset 410. If media downloading has not started 412, the system scheduler 30 calculates an optimal bitrate for WritePreset 414, and downloading starts or resumes for WritePreset 416.

The reader will recognize that the method described, in which media data is scheduled, for retrieval, storage and access, maximizes the efficiency of a media device with access to a network. These methods efficiently determine the media data bit rates required for retrieval to enable the activation of read access to a Preset Media Storage based on the contents of the Preset Media Storage and the aggregate data transfer rate. In addition, the methods described maximize the reuse of the media data while stored in the Preset Media Storage. Data retrieved may remain resident and be accessed multiple times without repetitive transmissions over a network and still satisfy the access restrictions placed on the data by the media content owners or copyright holders. Once a Preset Media Storage is activated for read access, the end user is able to continually access that Preset Media Storage without interruption.

The described methods can be utilized with any connection to a network. Landline, wireless or satellite transmissions are suitable connections to enable transfer of data from the network to the media device. The term media data includes but is not limited to audio, video, text, speech, MIDI, SMTPE, graphic and animations as potential types of media data that can be scheduled for retrieval, storage and access by an end user. The described methods for media data scheduled retrieval, storage and access may be realized in hardware, software or firmware implementations. Potential media devices included but not limited to the use of the described methods are computers, set top media devices, hand held devices, portable media devices, mobile media devices, wireless devices, satellite signal receivers and transmitting devices, and short wave and common band radio devices.

Although a preferred embodiment of the invention of a method and apparatus for scheduled retrieval, storage and access of media data has been described above by way of example only, it will be understood by those skilled in the field that modifications may be made to the disclosed embodiment without departing from the scope of the invention, which is defined by the appended claims.

We claim:

1. A computer-implemented method of processing media data from a network, the method comprising:
   obtaining, at a system scheduler from a user input controller, an indication to process the media data;
   obtaining, at a data transfer controller, at least a portion of the media data via the network, and providing the obtained media data to a media storage manager;
   monitoring, at said data transfer controller, a varying data transfer rate associated with obtaining at least a portion of the media data;
   periodically determining, at said data transfer controller, a statistical measure of the varying data transfer rate;
   periodically sending, at said data transfer controller, the determined statistical measure to a system scheduler;
   storing, at said media storage manager, the obtained media data in a local memory;
   periodically determining, at said media storage manager, local memory status information;
   periodically providing, at said media storage manager, the determined local memory status information to the system scheduler;
   periodically determining, at said system scheduler, a real time playback duration of the media data;
   predicting, at said system scheduler, in accordance with at least the periodically determined statistical measure and local memory status information, whether processing of the media data is likely to be interrupted;
   when processing is unlikely to be interrupted, signaling, by said system scheduler, a media processing engine;
   playing back, at said media processing engine, at least a portion of the media data in real time in accordance with the signaling by said system scheduler.

2. The method of claim 1, further comprising periodically determining, at said system scheduler, a target media bit rate in accordance with at least said real time playback duration and said periodically determined statistical measure.

3. The method of claim 2, further comprising, scheduling, at said system scheduler, said data transfer controller to obtain at least a second portion of the media data in accordance with said target bit rate.

4. The method of claim 1, wherein said local memory status information comprises an indication that said local memory has insufficient capacity to store additional media data, the method further comprising removing, by said media storage manager, a portion of media data from said local memory.

5. The method of claim 1, further comprising determining, by said system scheduler, an accessibility status for at least a portion of media data stored in said local memory.

6. The method of claim 5, further comprising:
   periodically providing, by said system scheduler, said accessibility status to said media storage manager; and
   removing, by said media storage manager, a portion of media data from said local memory in accordance with said provided accessibility status.

7. A computer readable storage medium having stored thereon computer executable instructions that, when executed by a suitable computing apparatus, perform the method of claim 1.

8. A computing apparatus comprising a processor, a memory, a system scheduler, a data transfer controller, a media storage manager, and a media processing engine, the memory storing instructions that, when executed by the processor, perform the method of claim 1.

9. A computer-implemented method of processing media data from a network, the method comprising:
   at a system scheduler: obtaining from a user input controller an indication to process the media data;
   at a data transfer controller: i) obtaining at least a portion of the media data via the network and providing the obtained media data to a media storage manager; ii) monitoring a varying data transfer rate as the media data is obtained via the network; iii) periodically determining a statistical measure of the varying data transfer rate; and iv) periodically sending said determined statistical measure to a system scheduler;
   at said media storage manager: i) storing the obtained media data in a local memory; ii) periodically determining local memory status information; and iii) periodically providing said determined local memory status information to the system scheduler;
   at said system scheduler: i) periodically determining a real time playback duration of the media data; ii) predicting, in accordance with at least said periodically determined statistical measure and local memory status information, whether processing of the media data is likely to be interrupted; and iii) when processing is unlikely to be interrupted, signaling a media processing engine;
   at said media processing engine: playing back at least a portion of the media data in real time in accordance with the signaling by said system scheduler.

10. The method of claim 9, further comprising periodically determining, at said system scheduler, a target media bit rate in accordance with at least said real time playback duration and said periodically determined statistical measure.

11. The method of claim 10, further comprising, scheduling, at said system scheduler, said data transfer controller to obtain at least a second portion of the media data in accordance with said target bit rate.

12. The method of claim 9, wherein said local memory status information comprises an indication that said local memory has insufficient capacity to store additional media data, the method further comprising removing, by said media storage manager, a portion of media data from said local memory.

13. The method of claim 9, further comprising determining, by said system scheduler, an accessibility status for at least a portion of media data stored in said local memory.

14. The method of claim 13, further comprising:
   periodically providing, by said system scheduler, said accessibility status to said media storage manager; and
   removing, by said media storage manager, a portion of media data from said local memory in accordance with said provided accessibility status.

15. A computer readable storage medium having stored thereon computer executable instructions that, when executed by a suitable computing apparatus, perform the method of claim 9.

16. A computing apparatus comprising a processor, a memory, a system scheduler, a data transfer controller, a media storage manager, and a media processing engine, the memory storing instructions that, when executed by the processor, perform the method of claim 9.

* * * * *